Oct. 30, 1962     H. F. STEPHENSON     3,061,060
ONE-WAY CLUTCH
Filed March 29, 1960

INVENTOR
HOWARD F. STEPHENSON
Edward H. Goodrich
HIS ATTORNEY

3,061,060
ONE-WAY CLUTCH
Howard F. Stephenson, Plainville, Conn., assignor to General Motors Corporation, Detroit, Mich., a corporation of Delaware
Filed Mar. 29, 1960, Ser. No. 18,366
4 Claims. (Cl. 192—41)

This invention relates to unidirectional drives and particularly to a one-way clutch for transmitting torque in only one direction of rotation between rotatable driving and driven members.

One form of unidirectional clutch known as the sprag type clutch, has a series of circumferentially spaced separately tiltable grippers arranged for substantially simultaneously tilting action into and out of wedged driving connection between a pair of radially spaced coaxial race rings. To maintain simultaneous shifting of these sprags into and out of driving relation, this type of construction usually requires a pair of coaxial guiding cages for the grippers. Since these grippers are circumferentially spaced and cage-controlled the number of grippers is necessarily limited with the result that such a clutch frequently has insufficient capacity to meet the desired needs within the space available for the clutch. Such clutches have many precision parts which are expensive to manufacture and difficult to assemble. Also, even a slight amount of wear on the wedging surface of one of the grippers frequently permits the gripper to move beyond its clutch-driving position making the clutch hence-forth inoperative.

It is, therefore an object of my invention to provide an improved one-way clutch of simple compact construction and which has a small number of inexpensive parts that are easy to assemble and which produce trouble-free operation.

It is a further object of this invention to provide an improved one-way clutch embodying a single clutching member provided with a series of closely spaced sprag-like elements that are resiliently and simultaneously urged by the clutching member towards cooperative one-way driving positions.

It is a further object of my invention to provide an improved one-way clutch of simple construction wherein an annular clutching member is provided with interconnected convolutions which serve the dual purpose of clutching elements and resilient members which urge the clutching elements into drive-engaging position.

To these ends and also to improve generally upon devices of this character, this invention consists in the verious matters hereinafter described and claimed. In its broader aspects, the invention is not necessarily limited to the specific structures selected for illustrative purposes in the accompanying drawings wherein:

FIGURE 1a is a fragmentary side elevation of another embodiment of my clutch;

FIGURE 3 is a fragmentary radial section of the clutch shown in FIGURE 1a.

Figure 2:
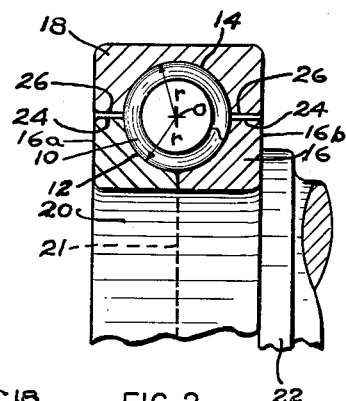
FIGURE 2 is a fragmenary section taken along the line 2—2 of FIGURE 1.

My improved one-way clutch has a clutching element 10 shaped as a circumferentially extending coiled spring having spaced turns or convolutions 11 which closely fit against a pair of radially spaced inner and outer annular raceways 12 and 14 respectively formed within inner and outer race rings 16 and 18. To facilitate assembly, one of the race rings as the inner race ring 16, which is mounted on a suitable shaft 20, is preferably made in two similar annular parts as 16a and 16b held together at their inner end abutting faces 21 at the base of the raceway 12. As indicated in FIGURE 2, the inner race ring parts 16a and 16b may be clamped together and suitably located on the shaft 20 against a shoulder 22. The outer end of each race ring portion 16a and 16b terminates in an annular land 24 and the outer ends of the outer race ring at each side of the raceway 14 terminate in annular lands 26. These lands 24 and 26 are normally in closely spaced radial relation. With this arrangement, each convolution of the clutch element 10 is closely confined into substantially race ring fitting relation throughout most of its periphery. Furthermore, under some deformations of the clutch element 10, the annular surfaces 24 and 26 may engage in plain bearing relation to maintain the race rings substantially coaxial as well as to prevent detrimental collapse of the spring 10 under abnormal loading conditions.

As illustrated in FIGURE 2, the transverse curvatures of the inner raceway 12 and the outer raceway 14 are preferably formed with the same radius $r$ struck from a common circularly extending element center $o$. This radius $r$ is preferably slightly less than one-half of the diameter of each convolution 11 so that these individual convolutions are too large to locate against the opposing inner and outer raceways in planes substantially radial of the inner and outer race rings 16 and 18. However, the diameter of each convolution 11 with respect to its fitting relation against the inner and outer raceways is such that the convolutions will wedgingly engage in driving relation against the inner and outer raceways at an angular position which closely approaches but does not reach a radial plane of the race rings through that convolution. When my one-way clutch is to transmit appreciable loads, I prefer that the coiled clutch element 10 be of such circumferential length that the inner radial portions of each convolution 11 which fit against the bottom of the inner raceway will be in adjacent abutting engagement to overcome any tendency for a sliding of these convolutions against the inner raceway when entering into driving engagement. Although it is preferred that the transverse curvatures of these raceways should closely conform in confining relation with each convolution 11, it should be understood that under light loads, such conforming relation is not necessary since a diametrical wedging action of these convolutions against opposing raceway surfaces will transmit a one-way clutch drive.

Figure 1:
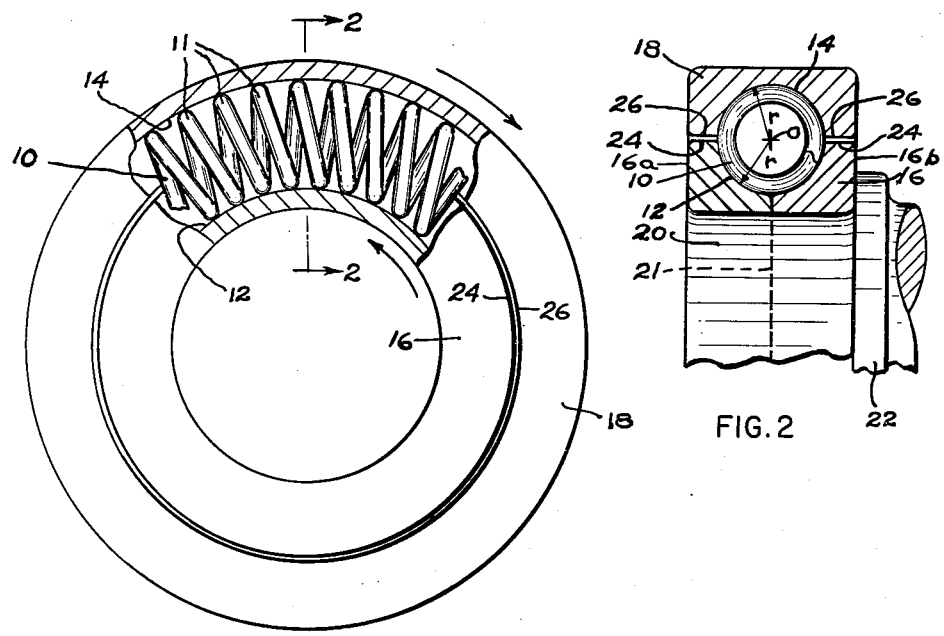
FIGURE 1 is a fragmentary side elevation of one form of my one-way clutch.

When the clutch element 10 is placed between the race rings 12 and 14 during assembly of my one-way clutch, the spring element 10 is longitudinally and resiliently deformed under circumferential shear or tangential stress within its elastic limit to locate the convolutions 11 in angular fitting relation between the raceways 12 and 14. With this arrangement, the spring under resilient shear stress will tend to return to its initial form thereby resiliently urging each convolution towards wedged driving engagement with the opposing raceway 12 and 14. As illustrated in FIGURE 1, when the outer race ring rotates in the direction of the arrow which in this instance is clockwise, or when the outer race ring overruns the inner race ring in a clockwise direction, the spring convolutions 11 fulcrum against the inner raceway 12 and swing towards a radial position of the raceways through each convolution causing a wedged driving engagement in a clockwise direction from the outer race ring to the inner race ring. Similarly, when the inner race ring rotates counterclockwise as indicated by the arrow, or in a counterclockwise overrunning direction with respect to the outer race ring, a similar wedging engagement occurs wherein each convolution 11 fulcrums against the outer raceway and tends to swing towards a radial position thus providing a wedged driving engagement producing a counterclockwise rotation between the inner and outer race rings. It will be appreciated, of course, that an opposite relative one-way driving relation will be provided between the raceways by changing the angular relation of the spring convolutions 11 to the other side of a radius through each convolution.

Referring again to the illustration of FIGURE 1, when the outer race ring rotates counterclockwise or in an overrunning counterclockwise direction with respect to the inner race ring, the spring convolutions 11 tilt out of wedged driving engagement while still remaining in raceway contact thereby providing a free-wheeling relationship between the raceways. This same condition occurs when the inner race ring is rotated clockwise or in an overrunning clockwise direction with respect to the other race ring. However, the inherent resiliency of the spring element 10 locates each of the convolutions 11 continuously in raceway driving position so that no lost motion occurs at the start of each driving engagement.

Figures 1A, 3:
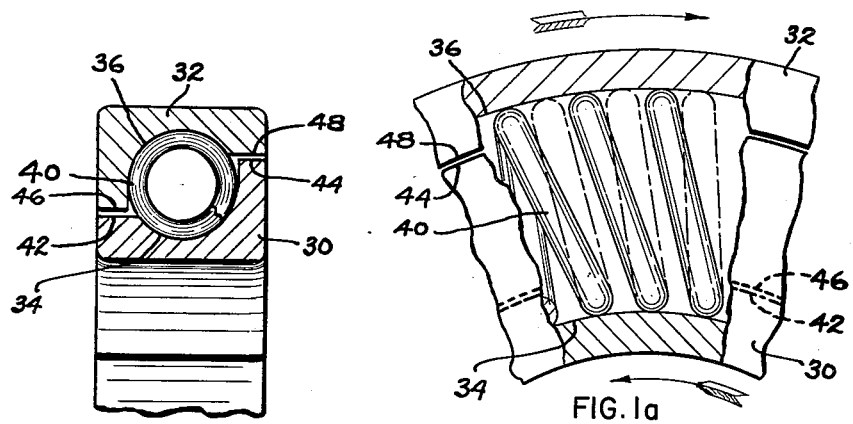

A modification of my invention is illustrated in FIGURES 1a and 3. In this construction, there is provided an inner race ring 30 and an outer race ring 32 respectively provided with raceways 34 and 36 in conforming relation with a one-way resilient coiled spring clutch element 40 generally corresponding to the clutch element 10. The inner race ring 30 is provided at one side of its raceway 34 with an annular land 42 and at the other side of this raceway with an annular land 44. One of these lands, as the land 44, is of considerably greater diameter than the other land as 42. Similarly, the outer race ring 32 at each side of the raceway 36 is provided with annular lands 46 and 48. The land 46 is of considerably less diameter than the land 48. The lands 46 and 48 respectively lie in closely spaced radial relation to the lands 42 and 44 to prevent collapse of the clutch spring element 40 and to provide an infrequent plain bearing support as explained with relation to the embodiment of FIGURES 1 and 2. With this arrangement, the spring-driving element 40 may be circumferentially shear-deformed at assembly and within its elastic limit sufficiently to pass the lands 42 and 48 over the diameter of each spring convolution after which the spring element 40 returns to its driving position against the opposed raceways 34 and 36. If desired, the adjacent annular lands, as 42 and 46, at one side of the clutch may be more nearly radially central of the spring convolutions in which event the clutch element is initially placed in the inner raceway 34 and the outer ring 32 is subsequently wound over this spring element 40 to snap the land 48 past the outer diameter of this clutch element 40. My one-way clutch as shown in FIGURES 1a and 3 operates in the same manner as the previously described clutch of FIGURES 1 and 2.

I claim:

1. A one-way clutch comprising a pair of relatively rotatable members respectively provided with annular raceways in radially spaced relation, said members being also respectively provided with annular lands at each side of said raceways, the adjacent opposing annular lands at each side of said raceways being normally positioned in closely spaced radial relation, an annular clutch element circumferentially extending between the raceways, resilient interconnected circular convolutions on the clutch element in tiltably seated engagement with both raceways throughout the major extents of said convolutions, said clutch element urging the convolutions into cooperative one-way driving engagement between the raceways, and said closely spaced opposing annular lands being engageable with each other to maintain said members substantially coaxial and to prevent said convolutions from distorting from their circular contours.

2. A one-way clutch comprising a pair of relatively rotatable members respectively provided with inner and outer annular raceways in radially spaced coaxial relation, said raceways having the same radius of transverse curvature extending from a common annular element axis therebetween, a generally spiral clutch spring circumferentially extending between the raceways and having spaced convolutions conformingly fitting against both raceways, each convolution being embraced throughout substantially its entire periphery by said raceways and having a radius of curvature exceeding the transverse radius of raceway curvature, each convolution engaging the raceways in a general plane which is in angular relation to a radial plane of the raceways through said convolution, said spring tiltably urging said convolutions into one-way driving engagement between said raceways, said race rings being respectively provided at each side of their raceways with closely spaced cylindrical lands in radial opposing relation, said opposing lands being engageable to maintain the race rings substantially coaxial and to limit the extent of tilt of the convolutions and to prevent collapse of said spring between the race rings.

3. A one-way clutch comprising a pair of relatively rotatable members respectively provided with coaxial annular raceways in radially spaced relation, said members being respectively provided at one side of the raceway with adjacent annular lands in closely spaced radial relation, said members having at the other side of the raceways a pair of similar closely radially spaced annular lands, one of said pairs of lands at one side of the raceways lying in closer radial spacing to the common raceway axis than said other pair of lands, a coiled spring clutch element circumferentially extending between the raceways, and convolutions on the clutch element matingly seating throughout their major peripheral extents against the raceways and resiliently urged into one-way wedged driving engagement between said raceways, the pairs of closely spaced lands at each side of the raceways being intermittently engageable to prevent the race rings from shifting out of substantially coaxial relation and to restrict the extent of angular deflections of said convolution against the raceway thereby preventing collapse of the clutch element.

4. A one-way clutch comprising a pair of relatively rotatable rings respectively having coaxial inner and outer raceways in radially spaced relation, the rings at one side of the raceways being respectively provided with a pair of coaxial annular lands in closely spaced radial relation, said rings at the other side of the raceways being provided with a similar pair of closely radially spaced annular lands, the pair of lands at one side of the raceways being radially spaced from the common raceway axis at a greater distance than said other pair of lands, a resilient annular clutch element circumferentially extending between the raceways, spaced convolutions on the clutch element tiltably seating throughout each of their major peripheral extents against the raceways for wedged driving engagement, said clutch element being located between the raceways under a tangential shear stress to resiliently urge the convolutions into cooperative one-way wedged driving engagement between said raceways, the pairs of closely spaced lands at each side of said raceways being intermittently engageable to prevent the race rings from shifting out of coaxial relation and to limit the extent of deflection of said convolutions and to prevent collapse of the clutch element.

References Cited in the file of this patent

UNITED STATES PATENTS

| 1,082,657 | Smith | Dec. 30, 1913 |

FOREIGN PATENTS

| 107,422 | Great Britain | June 28, 1917 |
| 679,252 | Germany | Aug. 1, 1939 |